United States Patent [19]

Geurtsen

[11] 4,242,209
[45] Dec. 30, 1980

[54] APPARATUS FOR SEPARATING MIXTURES OF LIQUIDS OF DIFFERENT SPECIFIC GRAVITIES, ETC.

[75] Inventor: Alfonsus A. Geurtsen, Deventer, Netherlands

[73] Assignee: Machinefabriek Geurtsen Deventer B.V., Deventer, Netherlands

[21] Appl. No.: 31,292

[22] Filed: Apr. 18, 1979

[30] Foreign Application Priority Data

May 9, 1978 [NL] Netherlands ........................ 7804982

[51] Int. Cl.³ ............................................. B01D 21/10
[52] U.S. Cl. ..................................... 210/519; 210/521; 210/537
[58] Field of Search ............... 210/304, 513, 521, 522, 210/532 R, 537, 538, 540, DIG. 23, 305, 519

[56] References Cited

U.S. PATENT DOCUMENTS

| 2,351,053 | 6/1944 | Klett | 210/305 |
| 3,450,264 | 6/1969 | Graybill | 210/521 |
| 3,529,719 | 9/1970 | Graybill | 210/304 |
| 3,794,583 | 2/1974 | Rhodes | 210/DIG. 5 |
| 3,888,768 | 6/1975 | Graybill | 210/304 |

Primary Examiner—Frank Sever
Attorney, Agent, or Firm—John P. Snyder

[57] ABSTRACT

An apparatus for separating a mixture of liquids of different specific gravities, e.g. oil and water, comprising a vessel containing a settling chamber and associated with conduits for the supply of mixture to be separated and the separate discharges of the components of the mixture, respectively, and with means to suppress completely or to reduce considerably turbulences occurring in the settling chamber.

9 Claims, 4 Drawing Figures

APPARATUS FOR SEPARATING MIXTURES OF LIQUIDS OF DIFFERENT SPECIFIC GRAVITIES, ETC.

The invention relates to an apparatus for separating a mixture of liquids of different specific gravities, e.g. oil and water, said apparatus comprising a settling chamber, a conduit for the supply of mixture to be separated opening into said chamber, a conduit for the discharge of lighter liquid connected to the settling chamber near the upper end thereof and a conduit for the discharge of heavier liquid being in communication with the lower end of the settling chamber.

A separating apparatus, e.g. an oil separator, of this type has been disclosed in the published Dutch patent application 7402216 (U.K. Pat. No. 1,469,204).

The separation takes place in vertical direction by gravity due to the difference of the specific gravities of the components and is optimal when the liquid is substantially at rest. Particularly, if the component liquids only slightly differ in specific gravity, as is the case with a mixture of water and heavy oil, the separation must take place, when the mixture is in a state of nearly complete rest. Due to the supply of mixture and the discharge of the separated components thereof there will always be a certain turbulence in the liquid contained in the settling chamber. When the separating apparatus is used on board of a ship there will also be a continuously varying position of the apparatus due to the swell, whereby the separation of the components is also affected.

The invention has the object to improve the separation of the components by avoiding the turbulences and provides, to that end, an apparatus of the above mentioned type, in which mounted in the settling chamber is at least one grid-shaped member having vertical passages to counteract turbulences of the liquids contained in said chamber and in which said antiturbulence member consists of a number of corrugated strips or parts of corrugated strips of predetermined width extending side by side, set edgewise and confining vertical passages and one or more distance strips of smaller width or distance wires interposed between said corrugated strips or parts of corrugated strips.

In this antiturbulence member according to the invention a certain mutual pressure compensation in horizontal direction between the vertical passages is possible, since as a result of the difference in the widths of the corrugated strips or parts of corrugated strips and the distance strips or the distance wires the vertical passages communicate with one another over a portion of their length through narrow open strip-shaped spaces. These open strip-shaped spaces offer a considerable resistance to the flow, so that they allow only a slight flow velocity. Due thereto the turbulences are substantially suppressed.

Without lateral pressure compensation it may occur that the interfaces between the heavy and the light liquid lie in several passages at different heights. One or more passages could then be entirely filled with light liquid such as oil. In that case it could happen that during the intermittent discharge of the separated liquids the lighter liquid will be forced to move downwards out of the passages in question which may result in an undesired mixing with pure heavy liquid. Owing to the possibility of horizontal flow the concentration at any height in all passages will be the same.

The antiturbulence member may consist of a disc disposed horizontally in the settling chamber and formed by winding together at least one corrugated strip of predetermined width and at least one flat distance strip of smaller width or a distance wire. In that case the disc-shaped antiturbulence member may consist of at least one spirally wound corrugated strip of predetermined width and at least two spirally wound distance strips of smaller width or distance wires lying at a distance from one another in the direction of the width of the corrugated strip.

To ensure a strong construction of the antiturbulence member the distance strips or wires may extend along the edges of the corrugated strip or strips and be locally welded to said edges.

In order to ensure a mixture inflow without turbulences into the settling chamber this chamber may be surrounded by an annular chamber which is connected to the mixture supply conduit on one hand and opens only near its upper end and near its lower end into the settling chamber through a number of openings made in and distributed along the circumference of the wall of the settling chamber on the other hand.

In this instance the antiturbulence member may be mounted in the settling chamber mainly between the upper and the lower row of openings of the wall between the annular chamber and the settling chamber.

The invention will be elucidated with the aid of the following description of an embodiment. In the drawing.

Figure 1:
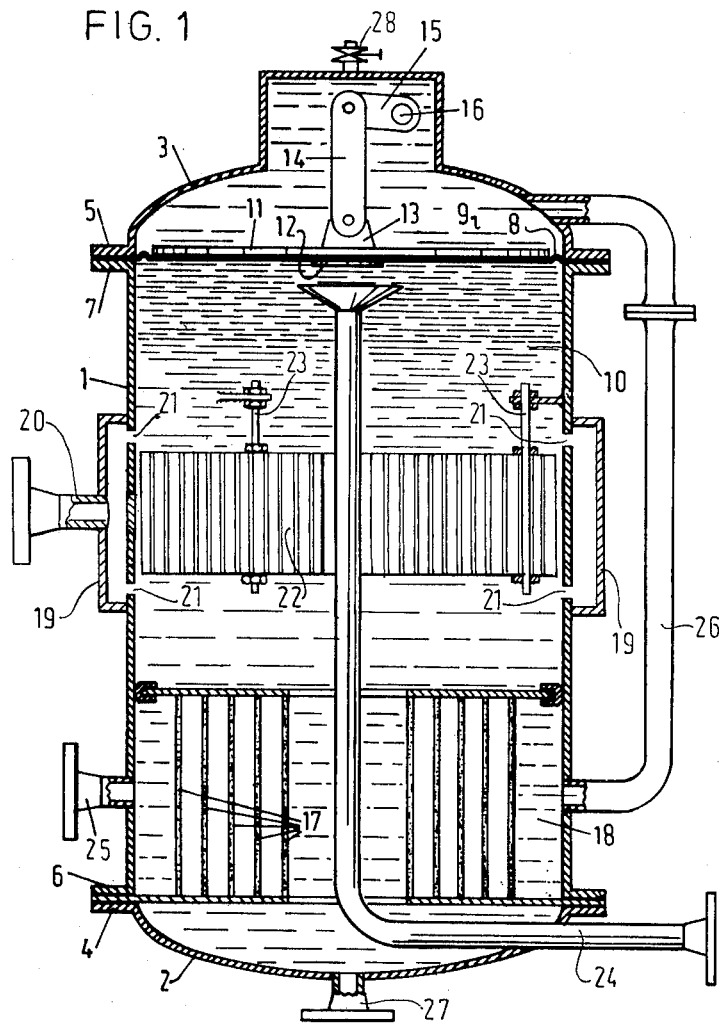
FIG. 1 is a vertical sectional view of a separating apparatus provided with an antiturbulence member according to the invention.

In the drawing 1 is a closed vessel having a detachable bottom 2 and a detachable upper wall 3. The bottom 2 and the upper wall 3 are attached by flanges 4, 5 to flanges 6, 7 provided at the end of the cylindrical wall of the vessel 1.

Clamped between the flanges 5 and 7 is a diaphragm 8 of easily flexible material which separates in the vessel an upper chamber 9 from a settling chamber 10 in a liquid-tight manner. Disposed on the diaphragm 8 is a rigid plate 11 which extends to a place near the wall of the vessel and is connected with the diaphragm in a small central area only. To that end the diaphragm is clamped between the plate 11 and a plate 12 of relatively small diameter. Near its centre the plate 11 is provided with lugs 13 and by means thereof rotatably connected to a link 14. This link is coupled at its upper end to a substantially horizontal arm 15 which is attached to a rotatable horizontal shaft 16 extending in a liquid-tight manner through the wall 3 and meant for the control of the process or the signalling of a certain state in the settling chamber.

Provided below the settling chamber 10 is a space containing a number of concentric filter cloths 17 which are situated between the settling chamber 10 and a collecting chamber 18.

Surrounding the settling chamber 10 is an annular chamber 19, into which a conduit 20 for the supply of mixture to be separated, e.g. a mixture of oil and water, opens. The chamber 19 communicates with the settling chamber through openings 21 which are made in and distributed along the circumference of the wall of the settling chamber 10. This arrangement ensures a quiet inflow of liquid to be separated. This inflow is distributed over the entire circumference, so that high local flow velocities cannot occur.

Figure 3:
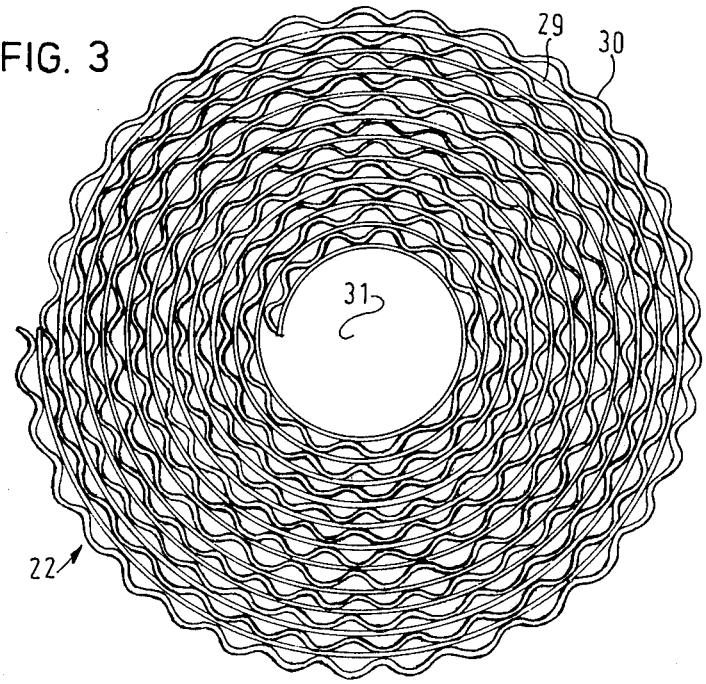
FIG. 3 is a horizontal cross sectional view of the antiturbulence member taken on the line III—III of FIG. 2.
Figure 2:
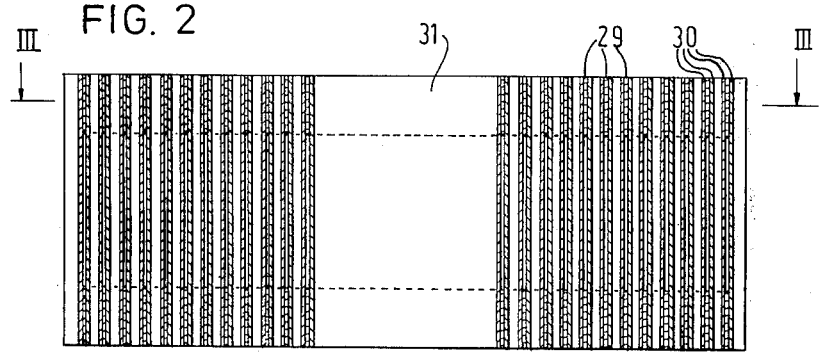
FIG. 2 is an axial sectional view of the antiturbulence member forming part of the separating apparatus shown in FIG. 1 and being provided near its two horizontal end faces with distance strips.
Figure 4:
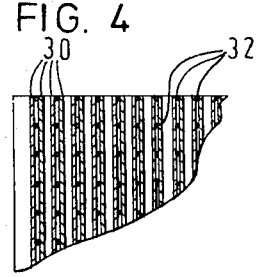
FIG. 4 is a sectional view corresponding to that shown in FIG. 2 of a portion of an antiturbulence member provided with distance wires.

The antiturbulence member, the construction of which will be elaborately described hereinafter with the aid of FIGS. 2–4, is situated in the settling chamber 10 between the upper and the lower row of openings 21. This place of the antiturbulence member has the advantage that the less effective separation in said member due to the greater resistance therein is entirely compensated by the separation which already occurs in the annular supply chamber 19. The antiturbulence member is attached to the wall of the settling chamber 10 by fastening means 23. Connected to the settling chamber 10 is a discharge conduit 24 for the lighter liquid, e.g. oil, of the mixture. The inflow opening of the discharge conduit 24 is found just under the lowest position of the diaphragm 8. A discharge conduit 25 for the heavier liquid, e.g. water, of the mixture is connected to the collecting chamber 18. The filters let pass practically only heavier liquid to the collecting chamber 18. The collecting chamber 18 is in open communication with the upper chamber 9 by means of a bypass conduit 26. The lowest point of the bottom 2 of the vessel is provided with a conduit 27 for the discharge of sludge. Normally this sludge discharge conduit is closed (not shown).

Before the separation of say a mixture of water and oil is started a vent valve 28 is opened for a moment and the vessel 1, 2, 3 is completely filled with water, for instance through the water discharge conduit 25. After the vessel has been entirely filled with water the mixture to be separated is supplied through the conduit 20 and the conduit 25 for the discharge of water is opened, whereas the conduit 24 for the discharge of oil is kept closed. The two components of the mixture are then separated in the settling chamber 10. In said chamber the oil moves upwards and collects under the diaphragm, whereas the water flows through the filters 17 into the collecting chamber 18, from whence it is discharged through the conduit 25.

When a layer of oil of given thickness has been formed under the diaphragm the latter is forced upwards by the lighter oil and the shaft 16 is rotated about a certain angle by means of the mechanical coupling members 11, 13, 14, 15. Owing to this rotation of the shaft 16 a signalling device may be actuated, whereby one is warned that oil must be discharged from the settling chamber 10 through the conduit 24. The shaft 16 may also directly operate a normally closed valve (not shown) provided in the conduit 24 and open same, when the diaphragm moves upwards.

After a given quantity of oil has been discharged from the settling chamber 10 the oil discharge conduit 24 is again either manually or automatically closed, so that the cycle can start again. The regulation due to the up and down movement of the diaphragm is very stable and can be exactly adjusted, since the water contained in the upper chamber 9, the bypass 26 and the collecting chamber 18 remains pure and consequently has a constant specific weight.

FIG. 2 shows an axial section of the antiturbulence member 22 illustrated in FIG. 1. This antiturbulence member has distance strips 29 near its two horizontal end faces.

As appears from FIG. 3 the corrugated strip 30 forms together with each one of the two distance strips 29 a number of vertical passages which are distributed over the entire cross section and through which the liquid can move only in vertical direction.

The distance strips 29 extend together over a part of the axial length of the antiturbulence member, so that in the remaining axial portion of the antiturbulence member the passages are not completely separated from one another and some lateral liquid transport is possible.

The antiturbulence member has an axial central opening to let the oil discharge conduit 24 pass through. The diameter of the antiturbulence member is slightly smaller than the inner diameter of the settling chamber 10.

FIG. 4 illustrates another embodiment of an antiturbulence member, in which the distance between successive layers of corrugated strip is not kept by distance strips but by distance wires 32. These wires may be formed as gauze.

What I claim is:

1. Shipboard apparatus for separating a mixture of immiscible liquids having different specific gravities while avoiding turbulences due to ship motion, comprising, in combination:

a vessel defining a vertically extending settling chamber;

means disposed between the upper and lower regions of said chamber for introducing the mixture of immiscible liquids quiescently into an intermediate region of said chamber whereby the lighter liquid tends to rise in said chamber while the heavier liquid tends to settle in said chamber;

first outlet means having an inlet communicating with the upper region of said chamber for withdrawing said lighter liquid;

second outlet means having an inlet communicating with the lower region of said chamber for withdrawing said heavier liquid; and flow restriction means substantially filling the cross section of said chamber at said intermediate region between said upper and lower regions of said chamber and presenting vertical passages directly communicating said upper and lower regions for restricting liquid surging between said regions whereby to maintain quiescent conditions in such regions;

said means for introducing the mixture comprising an annular chamber surrounding said intermediate region and having two sets of circumferentially spaced openings for uniformly introducing the mixture of immiscible liquids around said settling chamber, one set of openings being disposed immediately above said flow restriction means and the other set of openings being disposed immediately below said flow restriction means.

2. Apparatus as defined in claim 1 wherein said flow restricting means comprises porous means defining vertical passages communicating said upper and lower regions of said chamber and having horizontal communication between such passages.

3. Apparatus as defined in claim 1 wherein said flow restricting means comprises a plurality of porous, corrugated layers disposed within said chamber and a plurality of distance element layers sandwiched between said corrugated layers, the distance element layers being of lesser height than said corrugated layers.

4. Apparatus as defined in claim 3 wherein there are two sets of said distance element layers, one at the top and the other at the bottom of said corrugated layers.

5. Shipboard apparatus for separating a mixture of immiscible liquids of different specific gravities, e.g. oil and water, while avoiding turbulences due to ship motion, said apparatus comprising a vessel defining a settling chamber, a conduit for the discharge of the lighter liquid of the mixture connected to the settling chamber near the upper end thereof, a conduit for the discharge of the heavier liquid of the mixture being in communication with the lower end of the settling chamber, at least one grid-shaped antiturbulence member mounted in the settling chamber between said upper and lower ends thereof and having vertical passages to counteract turbulences of the liquids contained in said chamber and an annular chamber surrounding the vessel and opening into the settling chamber through at least one lower row and one upper row of openings in the vessel, said openings being distributed over the circumference of said wall, a supply conduit for introducing the mixture into said annular chamber whereby the mixture is introduced uniformly around the vessel into said settling chamber through said sets of openings, and the antiturbulence member substantially filling the cross section of the settling chamber between said lower and upper rows of openings.

6. A separating apparatus as claimed in claim 5, in which the antiturbulence member has the shape of a disc which is horizontally mounted in the settling chamber and is formed by winding together at least one corrugated strip of given width and at least one non-corrugated elongated distance element of smaller width.

7. A separating apparatus as claimed in claim 6, in which the disc-shaped antiturbulence member is constituted by at least one spirally wound corrugated strip of given width and at least two spirally wound non-corrugated, elongated distance elements of smaller width, said distance elements being spaced apart in the direction of the width of the corrugated strip.

8. A separating apparatus as claimed in claim 3, in which the distance elements extend along the edges of the corrugated strip and are locally welded to said edges.

9. A disc-shaped antiturbulence member for use in a separating apparatus as claimed in claim 5 constituted by corrugated strips of given width extending side by side, set edgewise and confining vertical passages and elongated distance elements of smaller width interposed between said corrugated strips.

* * * * *